United States Patent [19]

Sliker

[11] Patent Number: 5,139,060
[45] Date of Patent: Aug. 18, 1992

[54] DUPLICATION ATTACHMENT FOR WOOD TURNING LATHES

[76] Inventor: James A. Sliker, 15 Shingle Mill Rd., Rochester, N.Y. 14609

[21] Appl. No.: 474,963

[22] Filed: Feb. 5, 1990

[51] Int. Cl.$^5$ .............................................. B23B 3/28
[52] U.S. Cl. ........................................ 142/39; 142/7; 82/11.1
[58] Field of Search ............... 82/11.1, 11.2; 142/7, 142/13, 15, 35, 38, 39

[56] References Cited

U.S. PATENT DOCUMENTS

| | | | |
|---|---|---|---|
| 2,036,241 | 4/1936 | Taylor | 142/38 |
| 4,002,193 | 1/1977 | Schmidt | 142/7 |
| 4,588,005 | 5/1986 | Sliker | 82/1.11 |
| 4,627,477 | 12/1986 | Wise | 142/7 |
| 4,899,793 | 2/1990 | Snyder et al. | 142/49 |

Primary Examiner—William E. Terrell
Attorney, Agent, or Firm—Martin Lukacher

[57] ABSTRACT

A duplicator attachment for a wood turning lathe which provides the same freedom and control of the cutting action as in normal freehand turning operations, and enables duplication of all contours including inside contours and bowls. The duplicator attachment also enables the pattern to be supported on the same vertical center as the workpiece and above the workpiece rather than below or to the side of the workpiece, thereby permitting the full swing of the lathe to be utilized. The duplicator attachment provides an articulated support arm to bring the cutting tool and tracer, respectively, against the workpiece and pattern to be duplicated. The support arm has three sections which rotate conjointly to provide for movement of the cutting tool and tracer longitudinally along the center line of the lathe, laterally perpendicular to the center line of the lathe, and rotationally about axes mutually perpendicular to the directions of the lateral and longitudinal movements. A handle, attached to the support arm member to which the cutting tool and tracer is attached, permits manipulation, by an operator, of the cutting tool and tracer simulating freehand cutting action.

10 Claims, 5 Drawing Sheets

DUPLICATION ATTACHMENT FOR WOOD TURNING LATHES

The present invention relates to duplicator apparatus, and particularly to an improved duplicator attachment for turning machines.

While the invention is especially suitable for use as a duplicator attachment for a wood turning lathe, features of the invention will be applicable wherever cutting a workpiece to duplicate a pattern is desired.

This invention provides improvements in my prior invention described in U.S. Pat. No. 4,588,005, issued May 13, 1986.

The duplicator attachments which have been proposed prior to the invention of my patent either mount the cutting tool and tracer elements on a set of perpendicular ways (see U.S. Pat. Nos. 3,204,671 issued Sep. 7, 1965 and 3,277,933 issued Oct. 11, 1966) or incorporate a rotatable section between the perpendicular ways (see U.S. Pat. No. 4,588,005 issued May 13, 1986) or constitute cutter and tracer holders which slide on a table mounted to the bed of the lathe (see U.S. Pat. No. 3,768,527). The sliding, or "free foot" duplicator is difficult to use and requires strength to maintain the sliding tool and tracer holder on the table. Free foot duplicators also require the table to be mounted over the bed of the lathe which reduces the capacity of the lathe, as it relates to the diameter of the workpiece to be cut. The duplicator utilizing perpendicular ways restrict the motion of the cutting tool, and does not permit the operator the freedom and control as in normal freehand turning operations. Moreover, the cutting of interior contours is difficult and impossible for some interior contours, without resetting the cutting tool specifically for the cutting of the desired interior contour. The pattern in many duplicator attachments as have been proposed must be located below the workpiece, and usually between the workpiece and the bed of the lathe. The pattern and other parts of the attachment therefore restrict the diameter of the workpiece, and does not allow the full swing of the lathe to be used. The location of the pattern on attachments using ways also prevents the location of the attachment over the bed of the lathe when inside contours, and especially bowls, are to be duplicated.

My prior invention overcomes the problems of earlier attachments; however at a cost which has restricted its use. My present invention enables the cost of the attachment to be reduced without sacrificing the operational features of my prior invention.

It is an object of the present invention to provide improved duplicator apparatus which is adapted to duplicate all types of patterns, regardless of the contours therein and whether mounted between centers, as on flat template holders, or only on one side as on the driven spindle which extends from the headstock of the lathe.

It is a further object of the invention to provide improved duplicator apparatus which provides normal turning action as in freehand turning operations.

It is a still further object of the present invention to provide improved duplicator apparatus useful with a multifunction cutting machine using a carriage which is moveable longitudinally on the ways of the machine, as well as in lathes of the conventional design.

It is a still further object of the present invention to provide improved duplicator apparatus which is positionable directly over the centerline of the bed of the lathe to enable duplicating of inside contours, and even bowls.

It is a still further object of the present invention to provide improved duplicator apparatus which enables precise location of the cutting tool and precise alignment of the cutting tool and the pattern follower or tracer.

It is a still further object of the present invention to provide improved duplicator apparatus which does not restrict the size of the workpiece or pattern, the only restriction being that of the turning machine, for example, the swing of the lathe.

Briefly described, duplicator apparatus embodying the invention is adapted to cut a workpiece, to form the contours of a pattern, on a lathe. The apparatus utilizes an articulated support arm supporting the cutting tool which cuts the workpiece and a tracer which follows a pattern. The support arm has a plurality of sections, respectively mounted for rotational motion with respect to the others. Means are attached to one support arm member for conjointly moving the sections to provide for linear motions in longitudinal and transverse directions coupled with rotational motion so as to enable the tracer to follow inside as well as outside the contours of the pattern while the cutting tool cuts the workpiece to precisely duplicate the contours. Means are provided for mounting the duplicator apparatus to a lathe of the conventional design or to a multifunction woodworking machine.

The foregoing and other objects, features and advantages of the invention, as well as a presently preferred embodiment thereof, will become more apparent from a reading of the following description in connection with the accompanying drawings in which.

Figure 1:
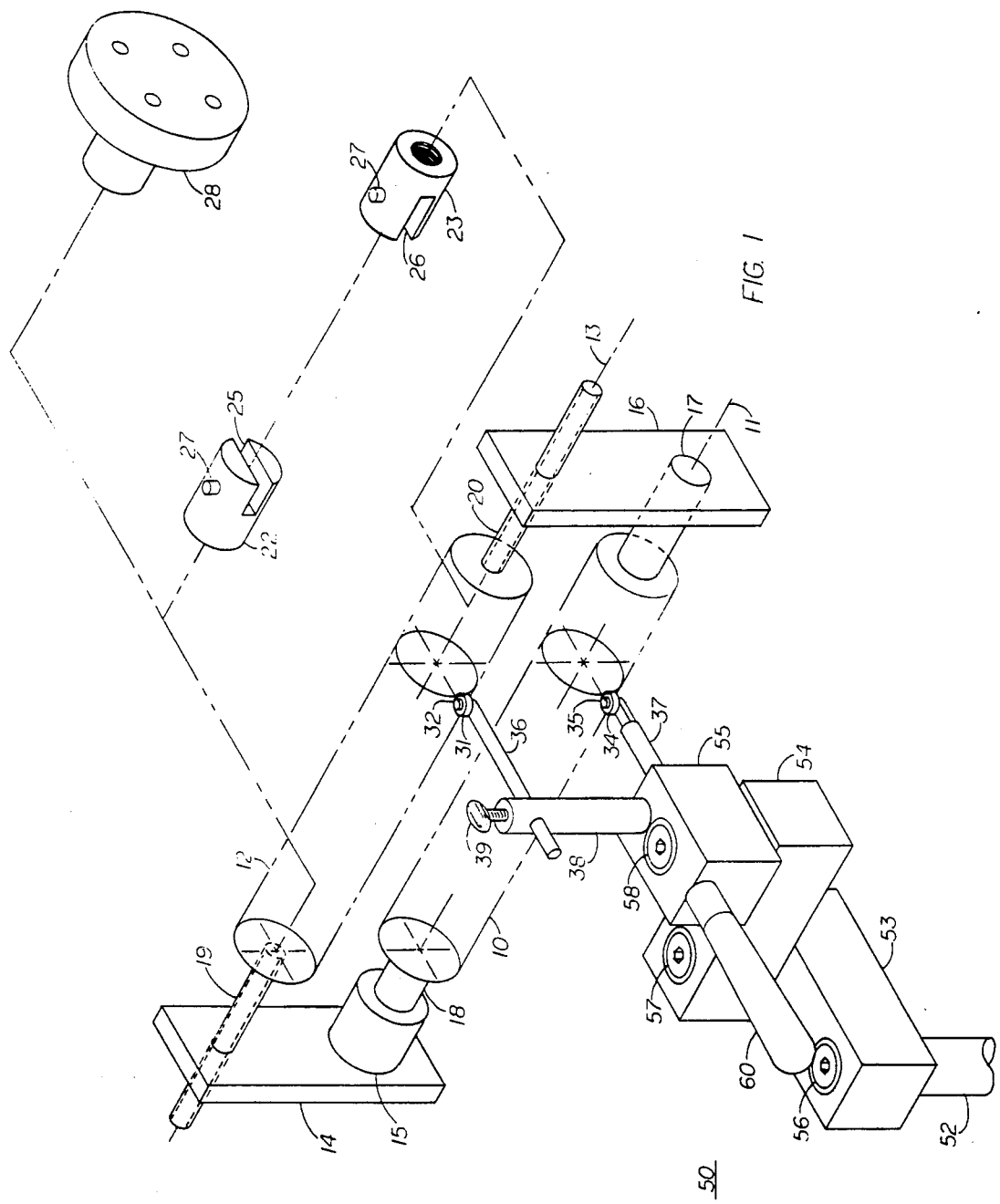
FIG. 1 is a perspective view, diagrammatically illustrating a duplicator attachment in accordance with a preferred embodiment of the invention.

Referring to the drawings, there is shown as is the case in my earlier U.S. Pat. No. 4,588,005 in FIG. 1, in outline form, a workpiece 10 and a pattern 12. The workpiece may be a block of wood to be turned. The pattern 12 may be a master, for example the first of several legs required for a table. The pattern may also be a template of the cross-section which describes the contours to be duplicated in the workpiece. A typical master is shown in the above-referenced U.S. Pat. No. 3,204,671. Sectional patterns are shown in the above referenced U.S. Pat. Nos. 3,277,933 and 3,768,527. Mounting brackets 14 and 16 may be secured respectively to the head stock and tail stock of the lathe or to the bed of the lathe, and are so aligned to be in a vertical plane above the workpiece.

Openings 15 and 17 in the brackets 14 and 16 enable the lathe centers to pass through the brackets 14 and 16. The usual pronged end 18 of the driven spindle of the lathe extends through the openings 15 in the bracket 14 into driving relationship with the workpiece 10. Accordingly, the workpiece is mounted along the center line 11 of the lathe which passes longitudinally through the lathe centers. The master or pattern 12 is fixedly secured to the brackets 14 and 16 above workpiece 10 by means of threaded centers 19 and 20 which are located in the brackets 14 and 16 to allow for longitudinal positioning of the pattern over the workpiece. The pattern 12 lies in a vertical plane perpendicular to the bed of the lathe which passes through the centerline 11 of the lathe. The mounting of the pattern 12 above the workpiece enables the full swing (maximum radius of rotation between the lathe centerline 11 and the bed of the lathe) of the lathe to be utilized.

Template holders 22 and 23 may be attached to the pattern centers 19 and 20 respectively, to allow for duplicating a flat pattern, or template, made of wood or metal. The flat template is located in slots 25 and 26 and secured by use of set screws 27.

For bowl or face plate turning, a face plate 28 is mounted to the pattern center 19 located in the headstock bracket 14. The workpiece is attached to the driven spindle 18 of the headstock utilizing a similar face plate, with a conventional glue joint for example.

Figure 2:
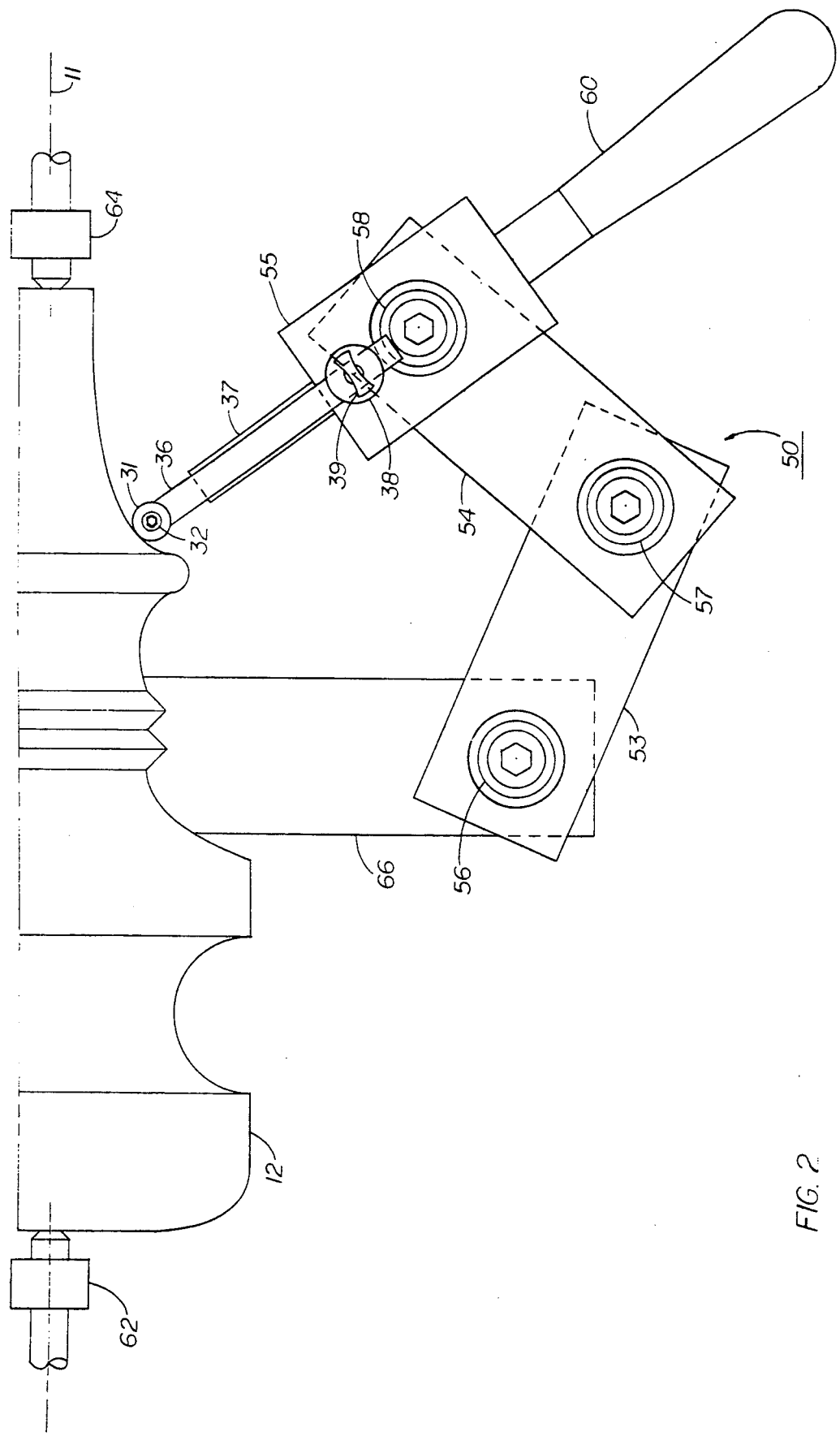
FIG. 2 is a plan view of the duplicator attachment shown in FIG. 1.

The lathe centers 62 and 64 are shown in FIG. 2. The lathe centerline is shown at 11 in FIGS. 1, 2 and 3. The pattern centerline is shown at 13 in FIGS. 1 and 3. The vertical plane perpendicular to the bed of the lathe is shown at 68 in FIG. 3.

The pattern 12 is traced by a tracer 31 while the workpiece is cut by a cutting tool 34. The cutting tool 34 and tracer 31 are disposed in vertical alignment spaced from each other with a spacing distance corresponding to the vertical distance between the centerlines of the workpiece 10 and the pattern 12. The tool 34 and tracer 31 are mounted on an articulated support arm 50 which enables conjoint movement of the tool 34 and tracer 31 in longitudinal, lateral and rotational directions along the centerline of the lathe.

Figure 3:
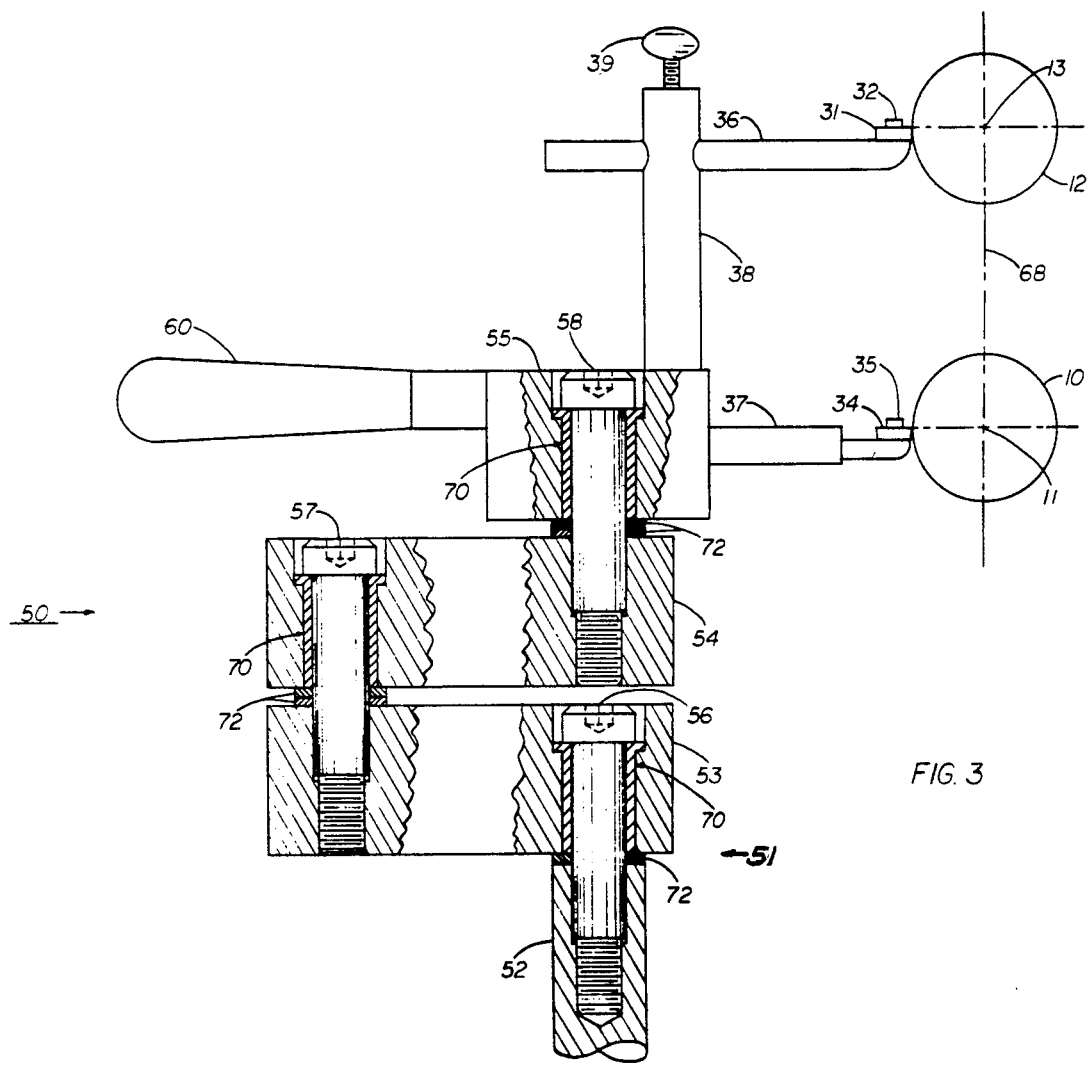
FIG. 3 is a side view, partially in section, of the duplicator attachment shown in FIG. 2.

The support arm 50 has three conjointly rotatable sections 53, 54 and 55. The lower section 53 rotates about a pivot bolt 56 attached to a mounting mechanism 51. This mechanism has a post 52 or a bracket 66 (FIG. 2). The middle section 54 rotates about a pivot bolt 57 attached to the lower section 53. The top section 55 rotates about a pivot bolt 58 attached to the middle section 54. FIG. 3 shows in section the pivoting mechanisms between the three conjointly rotatable sections of the support arm 50. Commercial bronze bushings 70 are pressed into vertical holes in sections 53, 54 and 55 to provide rotary bearing surfaces in which, respectively, standard shoulder bolts 56, 57 and 58 ride. Thus bolts are the pivot bolts and define axes of rotation for each section of the arm 50. The flange of the bushings 70 provides a thrust bearing surface under the heads of pivot bolts 56, 57 and 58. Commercial bronze thrust washers 72 are located around the diameters of the pivot bolts 56, 57 and 58, and respectively between the mounting attachment, post 52 or bracket 66, and the lower section 53, the lower section 53 and the middle section 54, and the middle section 54 and the upper section 55. The pivot bolts 56, 57 and 58 are threaded into their respective adjoining components and sufficiently tightened to provide for ease of rotational motion and minimal (preferably essentially zero) linear movement along the centerline of the pivot bolts. The heads of the pivot bolts are countersunk flush with the top edge of the respective sections to eliminate any interference with the adjacent sections. The horizontal spacing between pivot bolts 57 and 58 is of equal distance to that of pivot bolts 56 and 57 to allow the cutting tool 34 and tracer element 31 to be conjointly positioned at any point along the workpiece centerline 11 and the pattern centerline 13 respectively, and simultaneously at any horizontal distance from the vertical machine centerline 68 outward to the maximum swing or radial capacity of the lathe.

The upper section 55 has a tool support 37 attached to it. The cutting tool 34 is attached to the tool support 37 with a screw 35. The cutting tool utilized is a commercial carbide insert which is available in a variety of shapes such as round, square, triangular or diamond. A hole in the insert allows for secure mounting of the insert to the tool support 37 by means of a screw 35. The cutting tool 34 is readily changed to provide for different cutting actions or profiles The upper section 55 is of a suitable length to provide for adequate horizontal positioning of the cutting tool 34 and tracer element 31 with respect to the machine vertical centerline 68 and the horizontal distance outward thereof to the mounting post 52 or bracket 66, and is not required to be rotatable about its center.

A support post 38 is also mounted on the upper section 55. The tracer element 32, which is a duplicate shape of the cutting tool 34, is attached to a tracer arm 36 by a screw 32 in a like manner to the cutting tool 34. The tracer arm 36 is located by the support post 38, at a vertical distance equal to the distance between the workpiece centerline 11 and the pattern centerline 13. A thumb screw 39 provides for precise alignment of the tracer 31 with respect to the cutting tool 39. A handle 60 is attached to the back edge of the upper section 55 so as to carry out the conjoint movement of the three rotatable sections of the articulated support arm 50.

Figure 4:
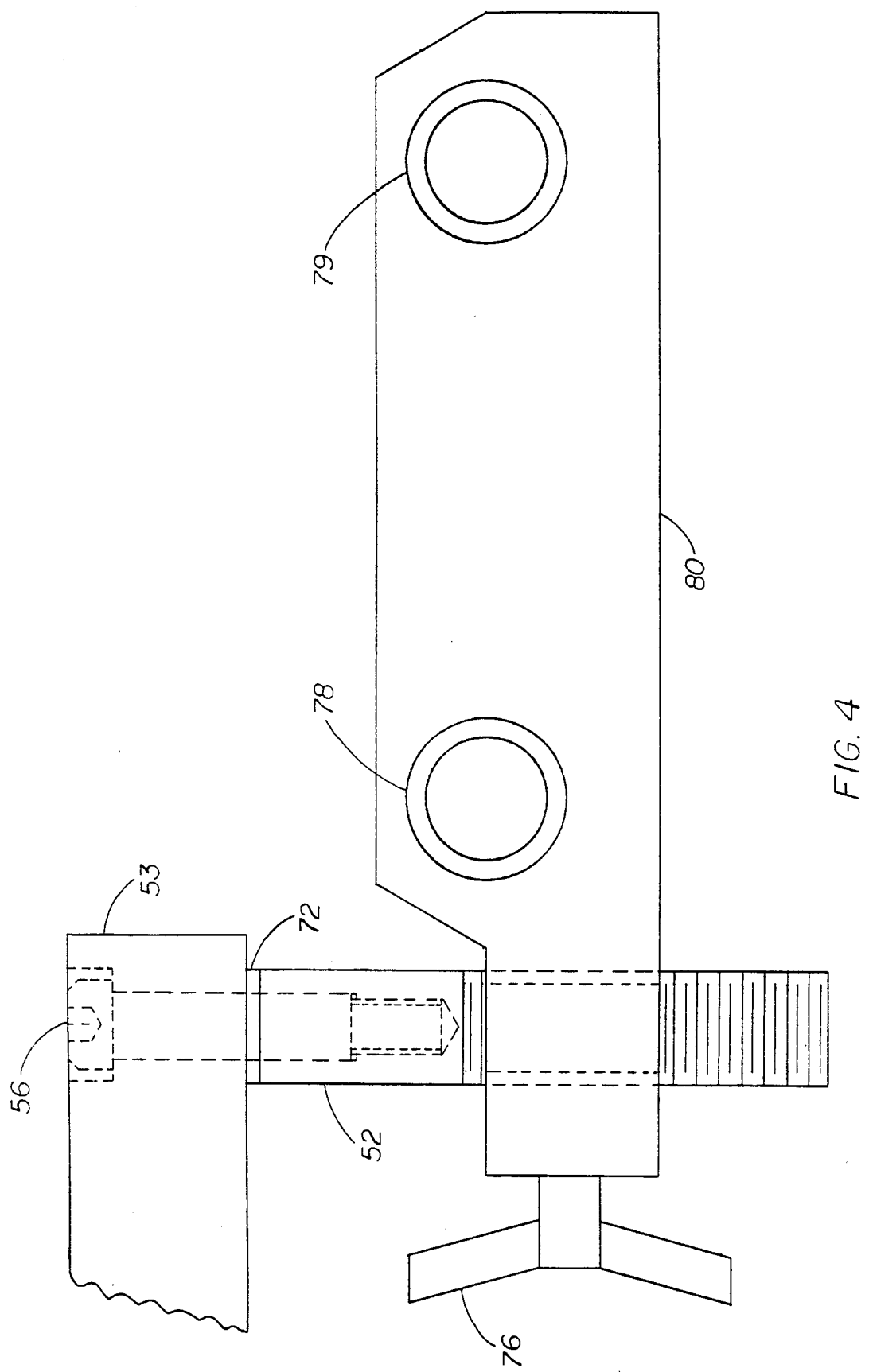
FIG. 4 is a partial side view of the duplicator attachment shown in FIG. 3 illustrating a mounting arrangement for multifunction woodworking machines.

The support arm 50 is mounted to the turning machine with the post 52 for multifunction woodworking machines or a bracket 66 for lathes of the conventional design. FIG. 4 shows a partial view of multifunction machine, such as "ShopSmith". The post 52 is of a construction allowing it to be received into the carriage 80 of the machine. The lower portion of the post 52 is threaded in a like manner to the machine's normal apparatus that mount on the carriage 80. The carriage 80 has existing mechanisms (not shown) to vertically position the post 52 and to provide for securing the post 52 to the carriage 80 by means of a locking arrangement (not shown) controlled by lever 76. On multifunction woodworking machines, the carriage 80 is longitudinally moveable along the tubular ways 78 and 79 of the machine. This longitudinal movement of the carriage 80 provides for repositioning of the duplicator apparatus, as required, to allow for the cutting of any length workpiece, up to the maximum capacity of the machine.

Figure 5:
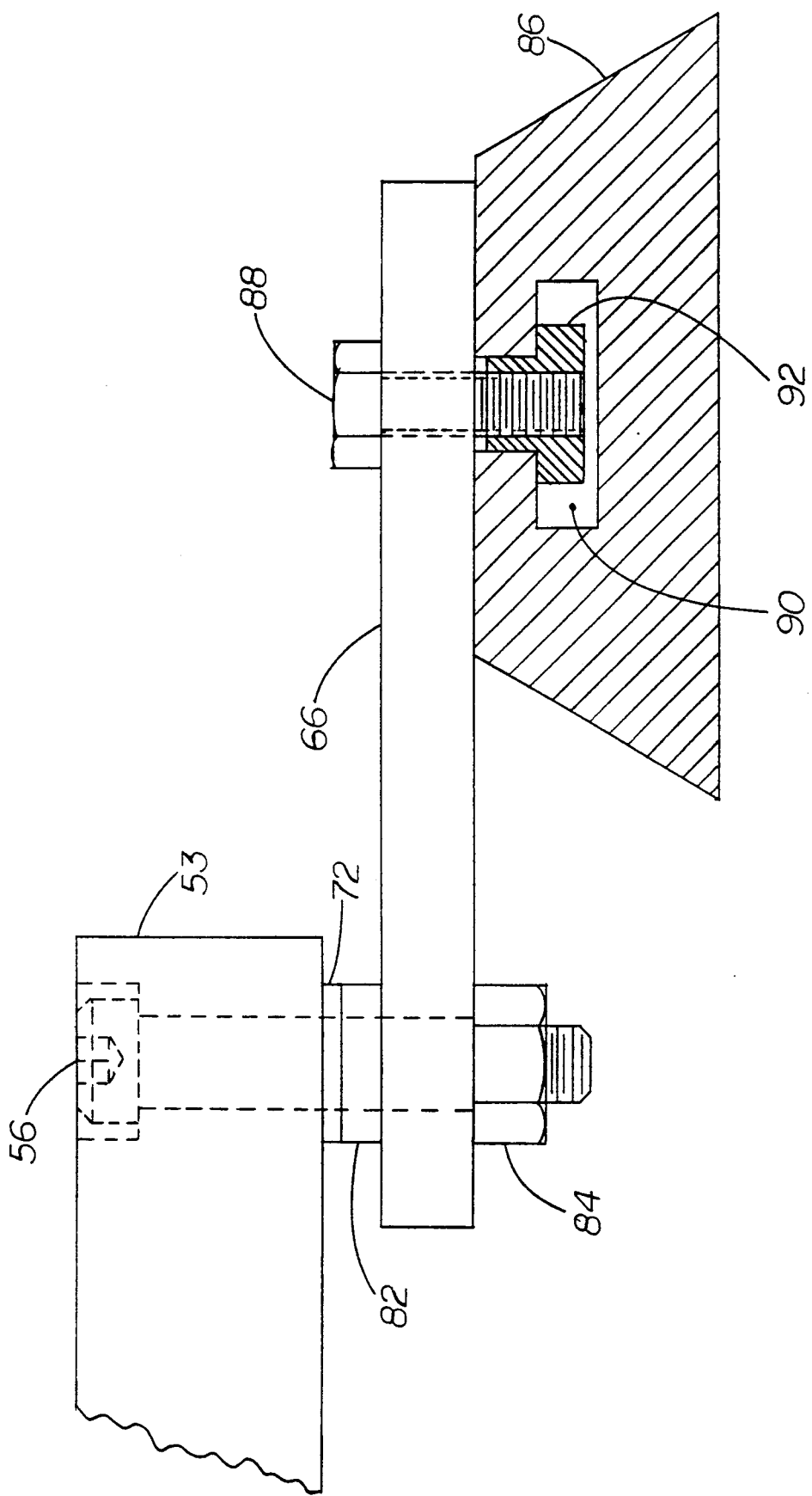
FIG. 5 is a partial side view partially in section, of the duplicator attachment shown in FIG. 2 illustrating a mounting arrangement for conventional wood turning machines.

FIG. 5 shows a partial view of a mounting arrangement suitable for lathes of the conventional design. The bracket 66 is attached to the bed 86 of the lathe by means of a bolt 88. The bolt 88 is threaded into a conventional tee nut 92 located within the tee slot 90 of the lathe bed 86. The bracket 66 may be repositioned longitudinally along the lathe bed 86, as required, to allow for the cutting of any length workpiece up to the maximum capacity of the lathe. The lower section 53 of the support arm 50 is secured to the bracket 66 by means of the pivot bolt 56 and a nut 84. A spacer 82 is provided between the bracket 66 and the aforementioned thrust washer 72 to attain the required vertical positioning of the cutting tool 34 with respect to the workpiece centerline 11. The thickness of the spacer 82 should be configured according to the specific lathe to which the duplicator attachment is mounted. The horizontal spacing between the pivot bolt 56 and attaching bolt 88 in the bracket 66 is also so configured to provide for proper positioning of the duplicator apparatus with respect to the bed of the specific lathe.

In operation, the handle 60 is manipulated by the operator in the like manner of a conventional lathe chisel used in free-hand turning operations, to direct the tracer and cutting tool conjointly in an exact duplicate path of each other. The ability to carry out lateral, longitudinal and rotational movements enables inside contours to be cut without any adjustments of the duplicator attachment. The duplicator provides a firm support for the cutting tool and tracer which enables safety in operations. The pivoting mechanisms are impervious to dust and debris and require no periodic cleaning or shielding. Bowl or face plate turning can be accomplished without any remounting of the duplicator as the articulated support arm will readily swing over the bed of the lathe and bring the cutting tool and tracer into a cutting position parallel to the centerline of the lathe as required for such turning.

From the foregoing description, it will be apparent that there has been provided improved duplicator apparatus especially suitable for use with wood turning lathes. While preferred embodiments for two types of machines have been described herein variations and modifications, within the scope of the invention, will undoubtedly suggest themselves to those skilled in the art. Accordingly, the foregoing description should be taken as illustrative and not in a limiting sense.

I claim:

1. A duplicator attachment for use on a turning lathe having a bed and a drive head which rotates a workpiece about a centerline of the lathe to enable cutting the workpiece into a duplicate of a pattern, which is mountable in spaced relationship with said pattern on said lathe, said attachment comprising an articulated support arm having a plurality of sections, a holder for a cutting tool for cutting said workpiece, tracer means for tracing said pattern, a first of said plurality of sections having said holder and tracer means mounted thereon in spaced relationship corresponding to the relationship of said workpiece and pattern, a second and a third of said plurality of sections, means for supporting said attachment on the bed of said lathe, means for attaching said first section to said second section for rotation about first axis, means for attaching said second section to said third section for rotation about a second axis different from said first axis, means for attaching said third section to said supporting means for rotation about a third axis, and means for manipulating said first section to move said cutting tool and said tracer into contact with and with respect to said workpiece and said pattern, respectively.

2. The attachment according to claim 1 wherein said axes are parallel to and spaced from each other.

3. The attachment according to claim 2 wherein said first and second axes and said second and third axes are spaced from each other by generally equal distances.

4. The attachment according to claim 2 wherein said axes are perpendicular to said centerline.

5. The attachment according to claim 3 wherein said axes are perpendicular to said centerline.

6. The attachment according to claim 3 wherein said first, second and third sections are first, second and third bars, respectively, said first attaching means is provided by a first pivot bolt extending from the center of the first bar into said second bar near one end thereof, said second attaching means is provided by a second pivot bolt extending from said second bar near an end thereof opposite to said one end of said second bar into said third bar near one end thereof, and said third attaching means is provided by a third pivot bolt extending from said second bar near an end thereof opposite to said one end thereof into said supporting means.

7. The attachment according to claim 6 wherein said manipulating means is a handle connected to said first bar.

8. The attachment according to claim 7 wherein said first bar has opposite ends, said handle and said tool holder and tracer extending in opposite directions, respectively, from different ones of said opposite ends.

9. The attachment according to claim 1 wherein said supporting means is a rod extending vertically into and threadly engagable with the bed of said lathe.

10. The attachment according to claim 1 wherein said supporting means is a bracket extending laterally outward from the bed of said lathe.

* * * * *